(12) United States Patent
Ichiki et al.

(10) Patent No.: US 7,396,518 B2
(45) Date of Patent: Jul. 8, 2008

(54) HIGH-TEMPERATURE DENITRATION CATALYSTS AND PROCESSES FOR PREPARING SAME

(75) Inventors: Masayoshi Ichiki, Osaka (JP); Kazuhiro Yano, Osaka (JP); Susumu Hikazutani, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 630 days.

(21) Appl. No.: 10/509,160

(22) PCT Filed: Mar. 27, 2003

(86) PCT No.: PCT/JP03/03783

§ 371 (c)(1), (2), (4) Date: Sep. 28, 2004

(87) PCT Pub. No.: WO03/082463

PCT Pub. Date: Oct. 9, 2003

(65) Prior Publication Data

US 2005/0159304 A1    Jul. 21, 2005

(30) Foreign Application Priority Data

Mar. 28, 2002  (JP)  ............................. 2002-090505
May 13, 2002  (JP)  ............................. 2002-136522

(51) Int. Cl.
*B01D 53/56* (2006.01)
*B01J 21/06* (2006.01)

(52) U.S. Cl. .................... 423/239.1; 502/350; 502/349; 502/305; 502/216; 502/217; 502/219; 502/220; 502/202

(58) Field of Classification Search .............. 423/239.1; 502/350, 349, 305, 216, 217, 219, 220, 202

See application file for complete search history.

(56) References Cited

U.S. PATENT DOCUMENTS

| | | | |
|---|---|---|---|
| 4,085,193 A | | 4/1978 | Nakajima et al. |
| 5,191,139 A | * | 3/1993 | Sanderson et al. .......... 585/520 |
| 5,336,476 A | | 8/1994 | Kintaichi et al. |
| 5,510,309 A | * | 4/1996 | Chang et al. ................. 502/308 |
| 5,658,546 A | | 8/1997 | Kobayashi et al. |
| 5,780,382 A | * | 7/1998 | Chang et al. ................. 502/309 |
| 5,780,383 A | * | 7/1998 | Hollstein et al. ............. 502/324 |
| 6,177,596 B1 | * | 1/2001 | Yadav et al. ................. 568/829 |

FOREIGN PATENT DOCUMENTS

JP    58-193733 A1    11/1983

OTHER PUBLICATIONS

M. Ichiki et al., "Development of the NH3-SCR catalyst for Simple Cycle Gas Turbine", Hitachi Zosen Giho, 2002, vol. 63, No. 1, pp. 10-13.
M. Akiyama et al., "De-Nox Catalyst Composed of Ceramic Paper—Performance of NOXNON-700", Shokubai, 1996, vol. 38, No. 2, p. 103.
International Search Report for PCT/JP03/03783 mailed on Jul. 15, 2003.

* cited by examiner

*Primary Examiner*—Timothy C. Vanoy
(74) *Attorney, Agent, or Firm*—Cheng Law Group PLLC

(57) ABSTRACT

The present invention provides a method of high-temperature denitration characterized in that NOx in an exhaust gas is reduced at 450° to 800° C. using ammonia as a reducing agent in the presence of a catalyst which comprises zirconium oxide and $SO_3$ or $SO_4^{2-}$ and has solid acid strength (Ho) of −11.93 or lower. The present invention also provides a method of high temperature denitration characterized in that NOx in an exhaust gas is reduced at 450° to 800° C. using ammonia as a reducing agent in the presence of a catalyst wherein at least one of tungsten oxide, molybdenum oxide and boron oxide is supported on a carrier comprising zirconium oxide and $SO_3$ or $SO_4^{2-}$ and having solid acid strength (Ho) of −11.93 or lower.

15 Claims, 5 Drawing Sheets

HIGH-TEMPERATURE DENITRATION CATALYSTS AND PROCESSES FOR PREPARING SAME

TECHNICAL FIELD

The present invention relates to a method of denitration wherein a reducing agent such as ammonia is injected into an exhaust gas discharged from boilers, gas turbines, engines, combustion furnaces and the like, thereby reducing and removing selectively nitrogen oxides in the exhaust gas in the presence of a catalyst (SCR method), the catalysts to be used for the method and processes for preparing the catalysts.

BACKGROUND ART

A denitration catalyst to be used for an SCR method is generally prepared by adsorbing and supporting a vanadium oxide on anatase titania and adding an oxide of tungsten, molybdenum or the like thereto. The catalyst has a peak of an active reaction temperature in a range of about 350° to 400° C., and its denitration performance is lowered with a rise in reaction temperatures at 400° C. or higher. A typical characteristic of the catalyst is shown in FIG. 9. The catalyst exhibits a rapid lowering of denitration performance particularly at 450° C. or higher, and formation of NOx due to combustion of ammonia is observed at 500° C. or higher.

Recently, there have been some exhaust gas systems which need denitration by the SCR method at temperatures of 450° to 600° C. such as a gas turbine and the like equipped with no waste heat recovery boiler. A method which can denitrate an exhaust gas effectively at temperatures of 450° to 600° C. without cooling the exhaust gas and catalysts to be used for this method are required.

For denitration in a high-temperature region, a selective reduction method of nitrogen oxides without a catalyst (NCSR method) is known, but an optimum temperature in this method is 700° to 800° C., and its denitration performance is practically at most 60%.

A catalyst wherein a tungsten oxide is supported on titania and a catalyst wherein the tungsten oxide is supported on a zeolite carrier have so far been proposed for the purpose of use in the above-mentioned temperature region.

However, since denitration performance of these catalysts is apparently lower than that of the vanadium oxide-supporting denitration catalyst to be used in an ordinary temperature range, they require a large amount thereof, injection of an excessive reducing agent, injection of particular additives into the exhaust gas or the like in order to obtain a denitration rate of 90% or higher.

A subject of the present invention is to provide a method of enabling denitration of the exhaust gas effectively at temperatures of 450° to 600° C. and catalysts to be used for this method.

DISCLOSURE OF THE INVENTION

Denitration performance is lowered at high temperatures of 450° C. or higher due to the following two causes.
(1) An ammonia oxidation-decomposition reaction on the catalyst surface.
(2) A decrease in amount of ammonia to be adsorbed on a catalyst.

If catalysts wherein necessary and sufficient measures have been taken against these causes are developed, efficient denitration can be carried out in the high-temperature region by the same system as that of the SCR method in an ordinary temperature region. The present invention was made from these points of view.

The oxidation of ammonia is considered to start with a hydrogen abstraction action from adsorbed ammonia by activated oxygen species ($O^-$, $O_2^-$ and the like) existing on the catalyst surface. The higher the temperature, the more easily are formed the activated oxygen species. To the contrary, when a proton ($H^+$) donating action is strong, adsorbed ammonia becomes stable $NH_4^+$ and is hardly subject to the oxidation-decomposition action at 600° C. or lower.

The ordinary catalyst solid surface hardly exhibits an ammonia adsorption action at 450° C. or higher.

Namely, when an ordinary SCR denitration catalyst is used at high-temperatures of 450° C. or higher, ammonia is hardly adsorbed. Even though a small amount of ammonia is adsorbed, the adsorbed ammonia is oxidized and decomposed by the action of a large amount of the active oxygen species existing in the circumference to form $N_2$ or NO. Its typical example is shown in FIG. 9 as mentioned above. This figure shows that the catalyst which exhibits effective denitration performance at 430° C. or lower exhibits a rapid lowering of denitration performance at 450° C. or higher, whereas formation of NOx is observed at 500° C. or higher.

The catalyst solid surface is considered to be generally covered with surface hydroxyl groups (—OH) at room temperature, but the active oxygen species is formed by a surface dehydration reaction with a rise in temperature ($2OH \rightarrow O^- + H_2O$: appearance of Lewis acid points).

On the solid acid surface, electrification of hydrogen of the hydroxyl group is observed (appearance of Brønsted acid points), and ammonia adsorptivity is high, but the Brønsted acid points decrease and the Lewis acid points increase with a rise in temperature.

The SCR reaction using ammonia is considered to be catalyzed by interminglement of the Brønsted acid points and the Lewis acid points, but when the balance between them is lost, the denitration performance is lowered.

At low temperatures: an increase in Brønsted acid points and a decrease in Lewis acid points.

At high temperatures: a decrease in Brønsted acid points and an increase in Lewis acid points.

From the above-mentioned points of view, desirable substances as denitration catalysts in the high-temperature region are substances having the balance between the Brønsted acid and the Lewis acid in a proper range in the high-temperature region at 450° C. or higher, a large surface acid point number (acid amount) and high thermal stability.

From the above-mentioned consideration, the present inventors found that when "solid superacids" having strong Brønsted acid points even at high temperatures are used as the catalysts, the "solid superacids" exhibit practical denitration performance in the high-temperature region.

Some substances which exhibit solid superacid actions have been reported ("Preparation of solid superacid catalysts using sulfuric acid", Kazushi Arata, Sulfuric Acid and Industry, September, 1997, p. 123).

Among the substances which exhibit the solid superacid actions, composite oxides obtained by making a sulfuric radical ($SO_4^{2-}$ or $SO_3$) act on zirconium oxides are known to have the strongest acid strength. However, when these compounds are used in a gas system hardly containing SOx such as a gas turbine exhaust gas at 500° C. or higher, an elimination phenomenon of the sulfuric radical is observed, and their denitration performance is not stabilized. A tin oxide system, an iron oxide system and the like are not desirable since these systems cause vigorous dissociation and adsorption actions of oxygen in addition of their superacid actions and accelerate oxidation of ammonia.

A first catalyst according to the present invention is a high-temperature denitration catalyst comprising a composite oxide composed of titanium oxide and at least one of tungsten oxide, molybdenum oxide and boron oxide and having solid acid strength (Ho) of −11.93 or lower. This solid superacid has the acid strength which is higher than that of sulfuric acid.

The first catalyst according to the present invention is obtained, for example, by impregnating dry titanium oxide with a solution containing at least one of tungsten, molybdenum and boron, then drying the titanium oxide and calcinating it under an oxygen atmosphere at temperatures of 500° to 800° C. A binder can be added to the powder catalyst, and the obtained mixture can be formed into particles. In the process above, the titanium oxide is dried preferably at temperatures of 300° C. or lower. After drying, the titanium oxide is impregnated with the oxide(s) of the above-mentioned element(s) while maintaining a high degree of the drying state. The titanium oxide is combined with the oxide(s) of the above-mentioned element(s) by calcination under the oxygen atmosphere at temperatures of 500° to 800° C.

The titanium oxide as the raw material is preferably amorphous titanium oxide which has a purity of 99% or higher and does not show a definite crystal form by X-ray diffraction.

The above-mentioned powdered or particulate first catalyst can be dispersed and retained among fibers of a ceramic fiber preform as a matrix thereby to form a plate.

The first catalyst according to the present invention can be a high-temperature denitration plate catalyst comprising a composite of the following metals obtained by dispersing and retaining the powdered or particulate titanium oxide among the fibers of the ceramic fiber preform, drying the titanium oxide, impregnating the titanium oxide with the solution containing at least one of tungsten, molybdenum and boron, then drying the preform and calcinating it under an oxygen atmosphere at temperatures of 500° to 800° C., and having solid acid strength (Ho) of −11.93 or lower. In the process above, the titanium oxide and the preform are dried preferably at temperatures of 300° C. or lower. After drying the titanium oxide, the titanium oxide is impregnated with the oxide(s) of the above-mentioned element(s) while maintaining a high degree of the drying state. The titanium oxide is combined with the oxide(s) of the above-mentioned element(s) by calcination under the oxygen atmosphere at temperatures of 500° to 800° C.

When the ceramic fiber preform is used, the ceramic fiber preform has preferably a honeycomb structure wherein a corrugated plate-like molded product and a flat molded product are superimposed alternately.

In a method of denitration using the first catalyst according to the present invention, a reducing agent is injected into an exhaust gas, and the exhaust gas is contacted with the catalyst according to the present invention at reaction temperatures of 400° to 700° C. to reduce and remove nitrogen oxides in the exhaust gas.

With regard to solid physical properties of the catalyst, a specific surface area is 10 to 100 m$^2$/g, crystal types of titania are generally anatase and rutile depending on the calcination temperature. Each can be sole and they can be mixed.

A rate of tungsten oxide, molybdenum oxide and boron oxide does not affect strength of a formed acid very much and mainly affects the acid amount. Namely, when this rate is too low, an amount of the formed superacid decreases. When the rate is too high, the excess does not contribute to formation of superacid points and prevents the reactants from diffusing into pores.

An important aspect for the ammonia SCR catalyst in the high-temperature region is appearance of the superacid points formed by highly drying anatase titania, which is regarded as amorphous by X-ray diffraction, contacting the anatase titania with an aqueous solution containing tungsten oxide, molybdenum oxide and boron oxide, and drying and calcining the anatase titania. Various solid physical properties obtained by solid surface structural analysis such as other many various spectral data do not affect the catalyst performance greatly.

The first denitration catalyst according to the present invention having the solid acid strength (Ho) of −11.93 or lower exhibits the following action.

Since the first denitration catalyst has strong electrification of hydrogen of hydroxyl groups on the surface, the catalyst can adsorb ammonia absolutely even at high temperatures. Namely, ammonia is reacted with the above-mentioned hydrogen to be adsorbed in the form of a stable $NH_4^+$ ion and contributes to the denitration reaction.

The superacidic catalyst hardly forms active oxygen species due to dissociation and adsorption of oxygen and inhibits the oxidation-decomposition reaction of ammonia, which is not favorable for the SCR denitration reaction.

Since the superacidic catalyst does not accelerate oxidation of ammonia and has the sufficiently high acid strength (Ho≦−11.93) and acid amount, the catalyst can be preferably used as the ammonia SCR catalyst in the high-temperature region at 450° C. or higher.

Since thermal stability of the present catalyst is high, its activity is hardly lowered even by heating it at 800° C. for a long time. In addition, formation of a sulfate is not observed, and there is no possibility of SOx poisoning.

Next, second and third catalysts according to the present invention are described.

Since the solid superacid has high acid strength, electrification of hydrogen of surface hydroxyl groups is strong, and the superacid can adsorb ammonia absolutely even at high temperatures. Ammonia is reacted with a proton to be adsorbed in the form of the stable $NH_4^+$ ion and contributes to the denitration reaction.

Among the substances which exhibit the solid superacid actions, the composite oxides obtained by making the sulfuric radical ($SO_4^{2-}$ or $SO_3$) act on zirconium oxides are known to have the strongest acid strength ("Preparation of solid superacid catalysts using sulfuric acid", Kazushi Arata, Sulfuric Acid and Industry, September, 1997, p. 123).

However, when this substance is used as the denitration catalyst in the gas system hardly containing SOx such as the gas turbine exhaust gas at temperatures of 500° C. or higher, an elimination phenomenon of the sulfuric radical occurs, and its denitration performance is not sometimes stabilized. Though the solid superacids such as a tin oxide system and an iron oxide system are also known, they are not desirable since they have vigorous oxygen dissociation and adsorption actions apart from their superacid actions and accelerate oxidation of ammonia.

From the above-mentioned consideration, the present inventors found that when "the solid superacids" having the Brφnsted acid points which are strong even at high temperatures are used as the catalysts, the "solid superacids" exhibit practical denitration performance in the high-temperature region.

The second and third catalysts are catalysts wherein elimination of the sulfuric radical from zirconium on which the sulfuric radical has been made act at high temperatures is reduced, and activity of the ammonia SCR reaction at the high temperatures is stabilized.

Namely, the second catalyst according to the present invention is a high-temperature denitration catalyst which comprises zirconium oxide and $SO_3$ or $SO_4^{2-}$, has solid acid strength (Ho) of −11.93 or lower and is used in a high-temperature region at reaction temperatures of 450° to 800° C., preferably 500° to 800° C., more preferably 550° to 750° C.

The third catalyst according to the present invention is a high-temperature denitration catalyst wherein at least one of tungsten oxide, molybdenum oxide and boron oxide is supported on a carrier comprising zirconium oxide and $SO_3$ or $SO_4^{2-}$ and having solid acid strength (Ho) of −11.93 or lower and which is used in a high-temperature region at reaction temperatures of 450° to 800° C., preferably 500° to 800° C., more preferably 550° to 750° C.

The second catalyst is prepared by preferably adding a basic solution such as an aqueous solution of alkali such as sodium hydroxide or potassium hydroxide or an aqueous ammonia solution to an aqueous solution of a nitrate or a chloride of zirconium to basify it, preferably filtering off and then washing with water the resulting zirconium hydroxide precipitates, then drying the obtained white powder (zirconium hydroxide) preferably at 300° C. or lower and calcining it preferably at 500° to 800° C., more preferably at 500° to 600° C.

The second catalyst is also prepared by adding a basic solution such as an aqueous solution of alkali such as sodium hydroxide or potassium hydroxide or an aqueous ammonia solution to an aqueous solution of a sulfate of zirconium to basify it, preferably filtering off and then washing with water the resulting zirconium hydroxide precipitates, then drying the obtained white powder (zirconium hydroxide) preferably at 300° C. or lower and calcining it preferably at 500° to 800° C., more preferably at 500° to 600° C.

In preparation of the third catalyst, in order to support at least one of tungsten oxide, molybdenum oxide and boron oxide on a carrier, an ordinary impregnation support method can be applied, but it is desirable to use an adsorption support method utilizing ion adsorptivity of the carrier. The other steps of the preparation of the third catalyst can be the same as those of the preparation of the second catalyst.

The second and third catalysts are basically in the form of powder, but the catalysts can be dispersed and retained among fibers of ceramic paper. The latter is prepared by impregnating the ceramic paper with a slurry of preferably 0.1 N or less dilute sulfuric acid containing 10 to 35% by weight of the catalyst, drying it, if necessary, and then calcining it. The slurry can contain a silica colloid solution having a solid concentration of 10 to 40% by weight to the slurry in a 0.05 to 1.0 volume ratio. Firmer plate type catalysts are formed by using the slurry containing the inorganic binder.

The second and third catalysts can be dispersed and retained among fibers of a honeycomb structure obtained by superimposing flat ceramic paper and corrugated plate-like ceramic paper alternately. This is prepared by impregnating the above-mentioned honeycomb structure with a slurry of preferably 0.1 N or less dilute sulfuric acid containing 10 to 35% by weight of the catalyst, drying it, if necessary, and then calcining it. The slurry can contain a silica colloid solution having a solid concentration of 10 to 40% by weight to the slurry in a 0.05 to 1.0 volume ratio. Firmer plate type catalysts are formed by using the slurry containing the inorganic binder.

The second and third catalysts hardly release the sulfuric radical, maintain strong solid acidity, do not accelerate oxidation of ammonia and have sufficiently high acid strength (Ho≦−11.93) and acid amount at high temperatures. Accordingly, the catalysts can be preferably used for the ammonia SCR reaction in the high-temperature region of 450° to 800° C., preferably 500° to 800° C., more preferably 550° to 750° C.

Since the second and third catalysts have high thermal stability, their activity is hardly lowered even by heating it at 800° C. for a long time. In addition, a tendency to form sulfates is not observed, and there is no possibility of SOx poisoning.

As solid physical properties, their specific surface area is 10 to 100 $m^2/g$, a zirconia crystal type is a mixture of a tetragonal system with a monoclinic system, and a peak ratio and the like differ depending on preparation conditions, but no definite relation between solid acid strength and catalytic activity is found.

Supporting tungsten oxide, molybdenum oxide and/or boron oxide does not affect the acid strength of the catalyst very much but mainly affects the acid amount. Namely, when a support amount of the oxide is too small, an acid amount of the formed superacid decreases. When the support amount of the oxide is too large, the excess does not contribute to formation of superacid points and causes inhibition of diffusion of the reactants in pores.

An important point for the ammonia SCR catalyst in the high-temperature region is appearance of solid superacid points, and various solid physical properties obtained by solid surface structural analysis such as various spectral data do not affect the catalyst performance significantly.

In the first to third catalysts according to the present invention, the acid strength (Ho) is an index showing electrification strength or ionization equilibrium of hydrogen of the surface hydroxyl groups and generally measured with a Hammett indicator. Ordinary acid strength of titania, silica, alumina and the like has the following approximate relation: $+1.5≧Ho>−5.6$, which is $10^6$ or more times lower than that of the solid superacid. The appearance of the superacid points can be easily visually confirmed qualitatively by adding a dry solid oxide to benzene and observing a coloring phenomenon. The acid amount is generally measured by an $NH_3$ adsorption temperature-programmed desorption method ($NH_3$ TPD).

The present invention is summarized as follows.
(1) The solid superacid catalyst is preferable as the ammonia SCR catalyst in the high-temperature region at 450° to 800° C.
(2) Though many solid superacid substances are known, zirconia on which the sulfuric radical is supported having the highest acid strength among them has a low ammonia oxidation property and high catalyst performance particularly at 550° C. or higher.
(3) The catalyst comprising the above-mentioned substances tends not to stabilize its performance because of effects of elimination of the sulfuric radical and the like, but necessary thermal stability is obtained by supporting tungsten oxide, molybdenum oxide and/or boron oxide.
(4) The catalyst performance is controlled by the acid strength and the acid amount and is hardly related to the other solid physical properties.

BEST MODE FOR CARRYING OUT THE INVENTION

Catalysts according to the present invention and processes for preparing same are practically shown below by Examples.

EXAMPLE 1

(1) Selection of Titania

Various titanium compound samples A to F shown in Table 1 were used as raw materials of superacid catalysts.

TABLE 1

(Various titania)

| Sample | Process for preparing titania | Remarks |
|---|---|---|
| A | A solution of titanium isopropoxide in 20% ethanol/water was added dropwise to pure water. The resulting precipitates were filtered off, washed with water, dried in air at 120° C. under air flow for six hours and ground into 100 mesh or less. | SA: 260 $m^2/g$<br>Anatase<br>Purity: 99% or higher |
| B | Commercially available titania sol (CSN manufactured by Ishihara Industry Co., Ltd.) was dried at 120° C. under air flow for 16 hours. The dried product was ground into 100 mesh or less, washed with water three times and dried. | SA: 185 $m^2/g$<br>Anatase<br>Purity: 85% or higher |
| C | Particulate titania, which is a reference substance of Catalyst Society, was ground into 100 mesh or less, washed with water three times and dried. | SA: 95 $m^2/g$<br>Anatase<br>Purity: 85% or higher |
| D | A commercially available titania slurry was dried at 120° C. under air flow for 16 hours. The dried product was ground into 100 mesh or less, washed with water three times and dried. | SA: 160 $m^2/g$<br>Anatase<br>Purity: 80% or higher |
| E | Commercially available titania powder (G5 manufactured by Millennium Co., Ltd.) was ground into 100 mesh or less. | SA: 230 $m^2/g$<br>Anatase<br>Purity: 99% or higher |
| F | Commercially available titania powder (DT 51 manufactured by Millennium Co., Ltd.) was ground into 100 mesh or less. | SA: 200 $m^2/g$<br>Anatase<br>Purity: 95% or higher |

(2) Appearance of Superacid Points

Each titania shown in Table 1 was dried at 120° C. under air flow and added rapidly to a 10.1% aqueous ammonium metatungstate solution without cooling, and the liquid was allowed to stand for three hours. Each filtered solid was dried at 120° C. for three hours and calcined in air at 700° C. for three hours under air flow. Specific surface areas and appearance of superacid points of the obtained powder samples A' to F' were measured. Measured results are shown in Table 2.

TABLE 2

(Surface areas of samples and appearance of superacid points)

| Sample | Appearance of superacid points | Specific surface area of sample | Crystal type |
|---|---|---|---|
| A' | Definite superacid points appeared. | 45 $m^2/g$ | Anatase |
| B' | A slight amount of superacid points appeared. | 55 $m^2/g$ | Anatase |
| C' | Not appeared | 48 $m^2/g$ | Anatase + rutile |
| D' | Not appeared | 62 $m^2/g$ | Anatase |
| E' | Definite superacid points appeared. | 60 $m^2/g$ | Anatase |
| F' | A slight amount of superacid points appeared. | 55 $m^2/g$ | Anatase |

(3) Catalyst Activity

Figure 1:
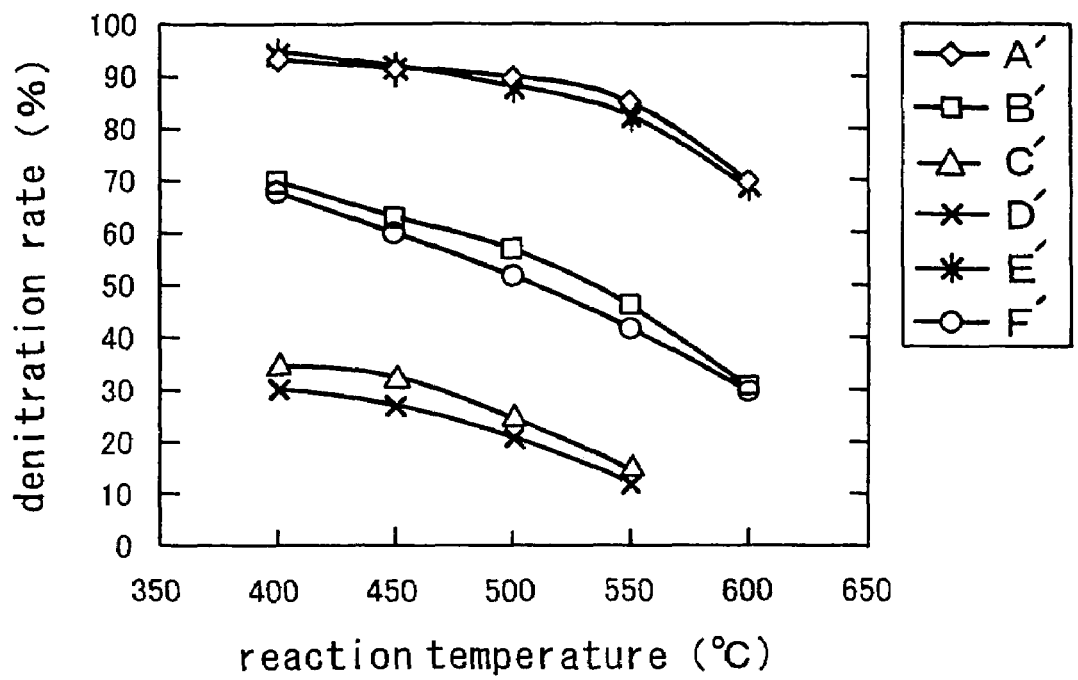
FIG. 1 is a graph of reaction temperatures and denitration rates showing denitration performance of samples of Example 1.

The above-mentioned powder samples A' to F' were compression molded to prepare particulate catalysts of 10 to 30 mesh. A reaction tube made of quartz glass was filled with each catalyst, and denitration performance was measured in an electric furnace at 450° to 600° C. under the following reaction conditions. Results are shown in FIG. 1.

Figure 2:
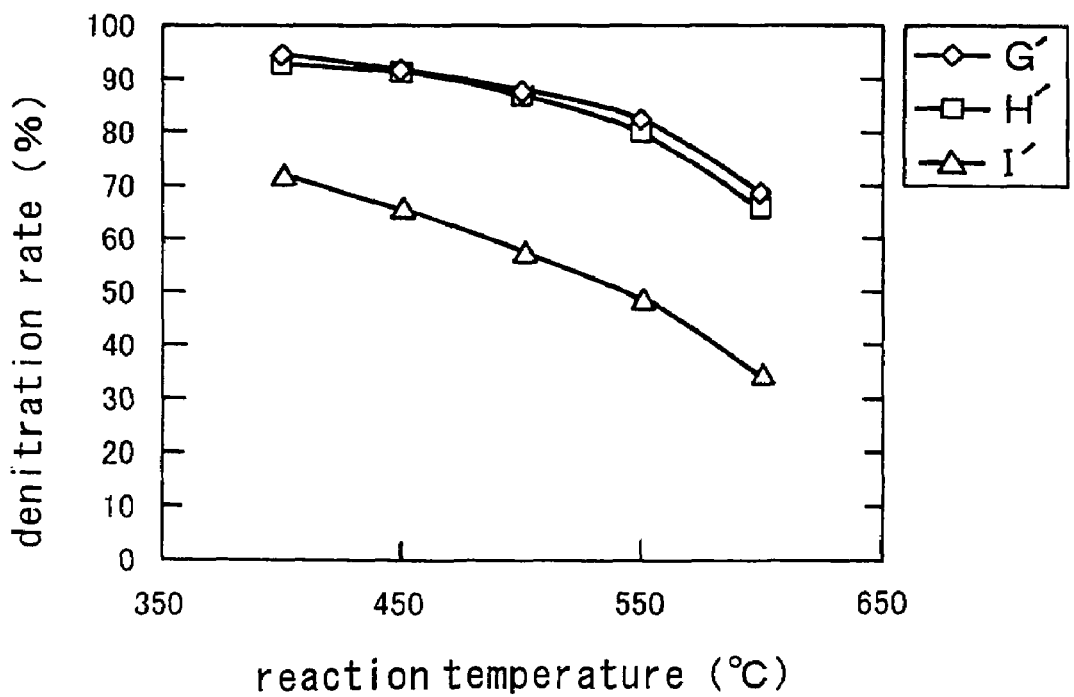
FIG. 2 is a graph of reaction temperatures and denitration rates showing effects of drying temperatures.

Reaction conditions SV: 90,000 1/h
Inlet gas composition NO: 50 ppm
$NH_3$: 60 ppm
$O_2$: 10%
$H_2O$: 10%
$CO_2$: 9%
$N_2$: balance (4) Effects of Drying Temperature The above-mentioned titania powder E was added to pure water and filtered to prepare hydrous titania, and it was dried under air flow. The obtained dried products were ground into 100 mesh or less to prepare fine particle samples G to I. These drying conditions are shown in Table 3. Tungsten oxide was supported on these fine particles in the same manner as in the above-mentioned (2) without cooling, and they were calcined at 700° C. for three hours. Appearance of superacid points of the obtained sample catalysts G' to I' was examined, and catalyst performance was measured under the same conditions as those in the above-mentioned (3). Results of effects of the drying temperatures thus examined are shown in FIG. 2.

TABLE 3

(Drying temperatures and time)

| Sample | Drying temperature | Drying time | Superacid points |
|---|---|---|---|
| G | 120° C. | 1 hr | Definite |
| H | 100° C. | 1 hr | Definite |
| I | 60° C. | 1 hr | Faint |

(5) Effects of Amount of Tungsten Oxide

Figure 3:
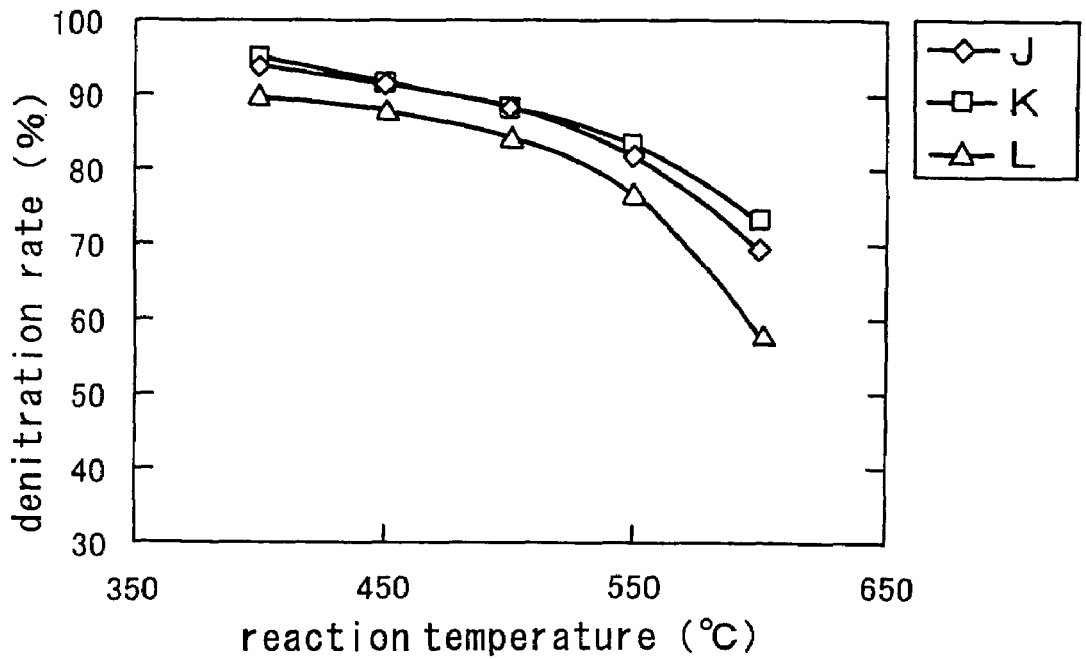
FIG. 3 is a graph of reaction temperatures and denitration rates showing effects of amounts of tungsten oxide.

Tungsten oxide was supported on the above-mentioned titania powder E in amounts shown in Table 4 using aqueous ammonium metatungstate solutions having various concentrations in the same manner as in the above-mentioned (2), followed by calcination at 700° C. for three hours. Catalyst performance of the obtained samples (J-L) was measured under the same conditions as those in the above-mentioned (3). Effects of the amount of W oxide are shown in FIG. 3.

TABLE 4

(Amounts of tungsten)

| Sample | Impregnating solution concentration (%) | Supported amount (W/Ti) |
|---|---|---|
| J | 5 | 0.69 |
| K | 15 | 1.03 |
| L | 30 | 1.49 |

(6) Effects of Calcination Temperature

Figure 4:
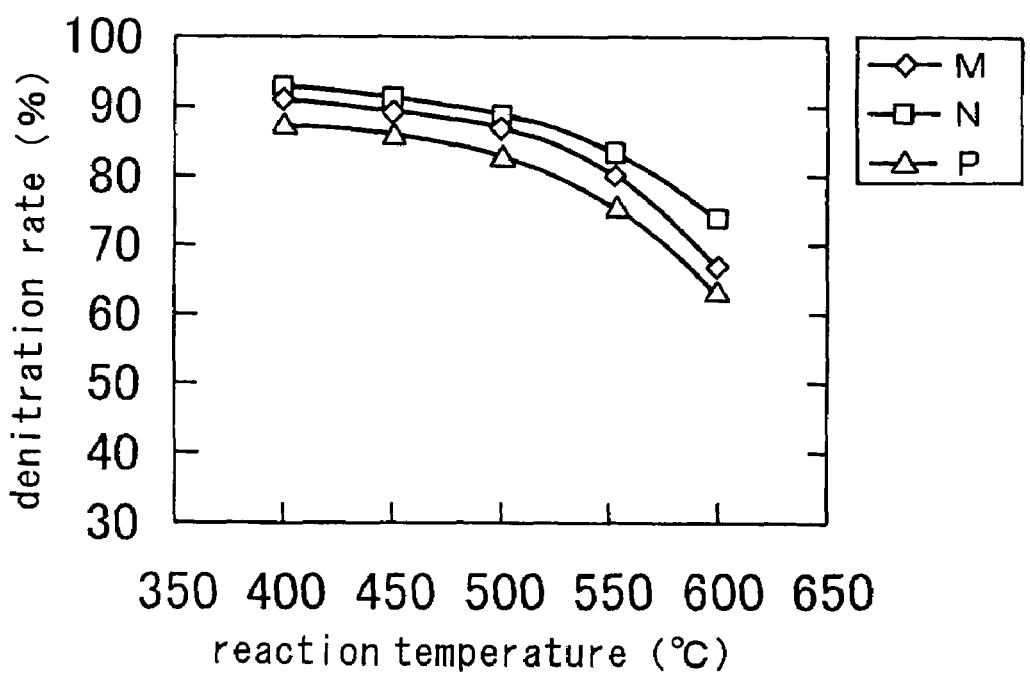
FIG. 4 is a graph of reaction temperatures and denitration rates showing effects of calcination temperatures.

Tungsten oxide was supported on the above-mentioned titania powder E in the same manner as in the above-mentioned (2), and it was calcined at various temperatures shown in Table 5 for three hours. Catalyst performance of the obtained samples (M to P) was measured under the same conditions as those in the above-mentioned (3). Effects of the calcination temperature thus examined are shown in FIG. 4.

TABLE 5

(Calcination temperatures)

| Sample | Calcination temperature |
|---|---|
| M | 600° C. |
| N | 700° C. |
| P | 800° C. |

(7) Superacids Derived from Molybdenum Oxide and Boron Oxide

Figure 5:
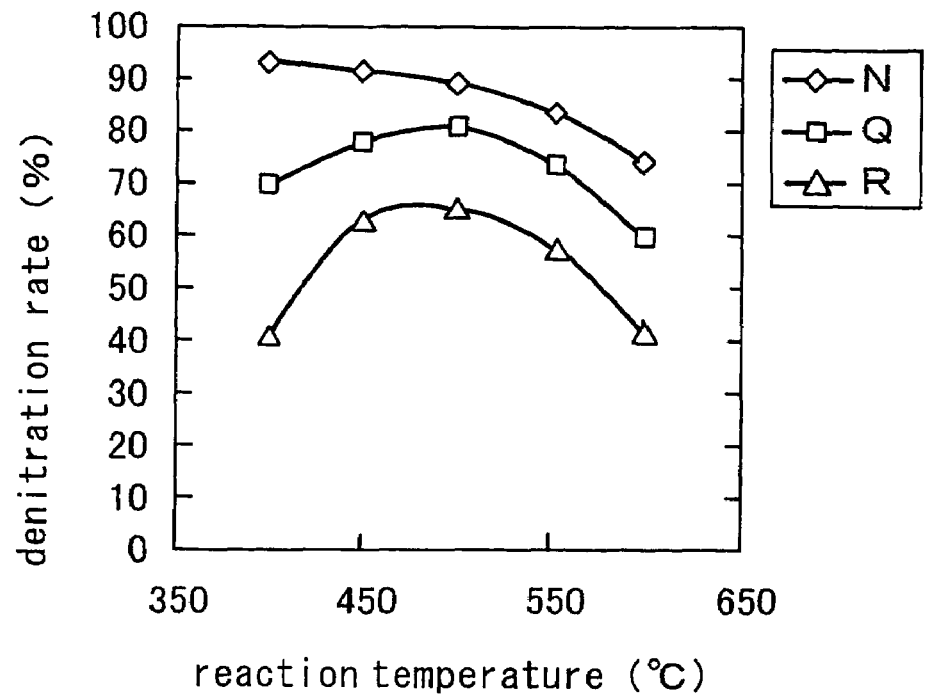
FIG. 5 is a graph of reaction temperatures and denitration rates showing superacids using molybdenum oxide and boron oxide.

Ammonium molybdate (($NH_4$)$_6$[$Mo_7O_{24}$].$4H_2O$) as molybdenum oxide or orthoboric acid ($H_3BO_3$) as boron oxide was supported on the above-mentioned titania powder E in the same manner as in the above-mentioned (2), and it was calcined at 700° C. for three hours. Catalyst performance of catalyst samples (Q and R) having superacid points (their characteristics are shown in Table 6) due to molybdenum oxide and boron oxide was measured under the same conditions as those in the above-mentioned (3). Thus examined results are shown in FIG. 5.

TABLE 6

(Superacids using Mo and B)

| Sample | Supported Metal | Immersing solution concentration | Superacid points |
|---|---|---|---|
| Q | Mo | Room temperature saturation | Weak |
| R | B | Room temperature saturation | Weak |

(8) Performance of Plate Type Catalyst

Tungsten oxide was supported on the above-mentioned titania powder E in the same manner as in the above-mentioned (2), it was calcined in air at 600° C. for three hours to obtain tungsten/titania system solid superacid powder. This powder was ground into 100 mesh or less, and pure water was added thereto to prepare a slurry having a solid content of 20% by weight. Then 16 N nitric acid was added to water in a ratio of 1/1,000 to 1/2,000 (volume ratio) in order to prevent the fine particles from aggregating. Twenty parts by weight of colloidal silica (Snowtex 0 manufactured by Nissan Chemical Co., Ltd.) as a binder were added to 100 parts by weight of the slurry, and the mixture was quickly stirred.

Figure 6:
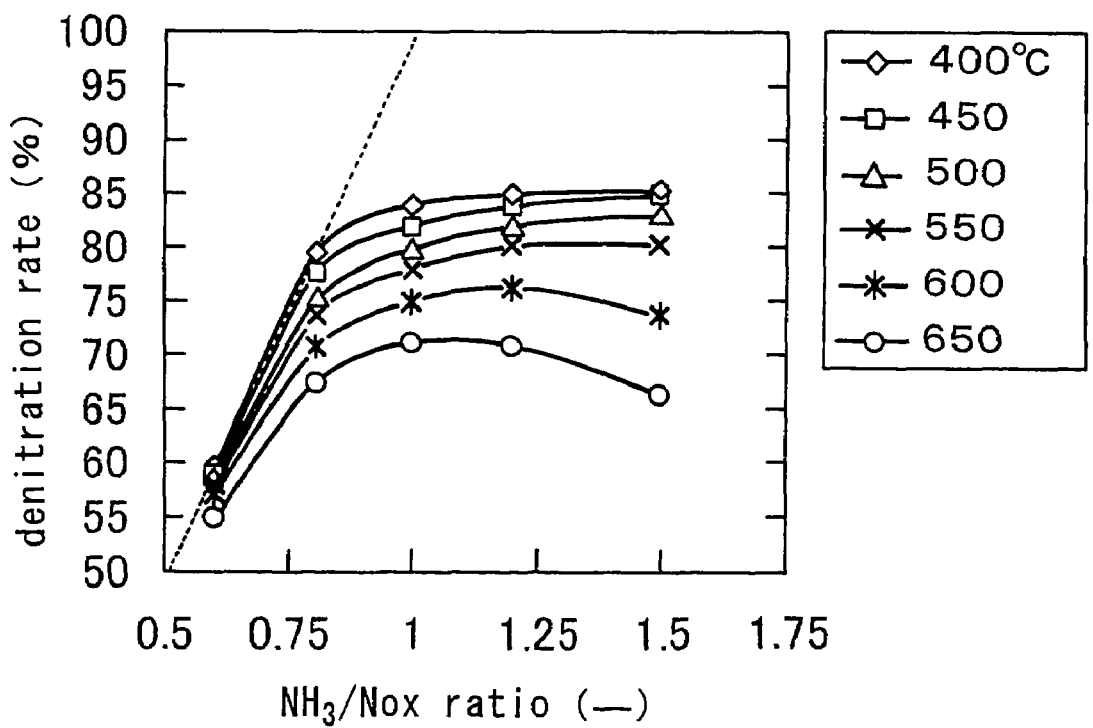
FIG. 6 is a graph of reaction temperatures and denitration rates showing performance of plate type catalysts.

Ceramic paper (SMS 05 manufactured by Nippon Inorganic Co., Ltd.) was immersed in the slurry to retain the slurry among fibers of the paper, and the mixture was dried at 120° C. and calcined at 400° C. for three hours to obtain a plate type catalyst wherein 56 g/m$^2$ (one side of the paper) solid superacid powder was dispersed and retained. Denitration performance of the plate type catalyst was measured at different temperatures under the following reaction conditions. Results are shown in FIG. 6.

Reaction test conditions
Gas composition Inlet NO: 50 ppm
Inlet $NH_3$/NOx ratio: 0.6 to 1.5
$O_2$: 10%
$H_2O$: 10%
$CO_2$: 9%
$N_2$: rest
Catalyst amount AV: 20 Nm$^3$/h
(AV=raw gas flow rate/catalyst geometric surface area)

EXAMPLE 2

(1) Preparation of Zirconium Hydroxide

Each zirconium salt shown in Table 7 was dissolved in ten-fold volume of a 0.01 N acidic sulfuric acid solution, 1.0 N $NH_3$ water was added dropwise to the mixture, and the resulting white precipitates were filtered off, washed with water once and dried at 120° C. The dry product was ground into powder of 100 mesh or less, and it was used as a raw material of a superacid catalyst.

TABLE 7

| | Zirconium salt | Specific surface area of resulting powder |
|---|---|---|
| A | Zirconium oxychloride octahydrate $ZrCl_2O$•$8H_2O$ | SA: 230 m$^2$/g |
| B | Zirconium sulfate (EAKO CHEMICAL) | SA: 125 m$^2$/g |
| C | Zirconium nitrate dihydrate $ZrO(NO_3)_2$•$2H_2O$ | SA: 98 m$^2$/g |

(2) Appearance of Superacid Points

Powder of each zirconium hydroxide shown in Table 7 was dried in air at 120° C. under air flow again and rapidly added to a 1 mol/l aqueous ammonium sulfate solution without cooling, and the liquid was heated to evaporate it to dryness.

Then an amount of the aqueous ammonium sulfate solution was adjusted so that a molar ratio of Zr to a sulfuric radical was 0.1/1.

The evaporated dried product was dried at 120° C. for three hours and then ground into 100 mesh or less, and it was calcined in air at 600° C. for three hours.

Specific surface areas and appearance of superacid points of the obtained superacid substances were measured. Since superacid strength cannot be measured with a Hammett indicator, it was estimated from activation energy of adsorption-desorption equilibrium of Ar. Results are shown in Table 8.

TABLE 8

| | Appearance of superacid points | Specific surface area | Crystal type |
|---|---|---|---|
| D | −12.5 < Ho < −11.9 | 110 m$^2$/g | Tetragonal < monoclinic |
| E | Ho < −12.5 | 91 m$^2$/g | Tetragonal > monoclinic |
| F | −12.5 < Ho < −11.9 | 76 m$^2$/g | Tetragonal < monoclinic |

(3) Catalyst Activity

The superacid substance (E) which exhibits the highest acid strength was compression molded to form a particulate catalyst of 10 to 30 mesh. This is referred to as a catalyst (E).

The particulate carrier of 10 to 30 mesh obtained by compression molding the superacid substance (E) was immersed in a 1.0 mol/l aqueous ammonium metatungstate solution for 30 minutes, dried and calcined in air at 400° C. for three hours to obtain a particulate catalyst (G).

Figure 7:
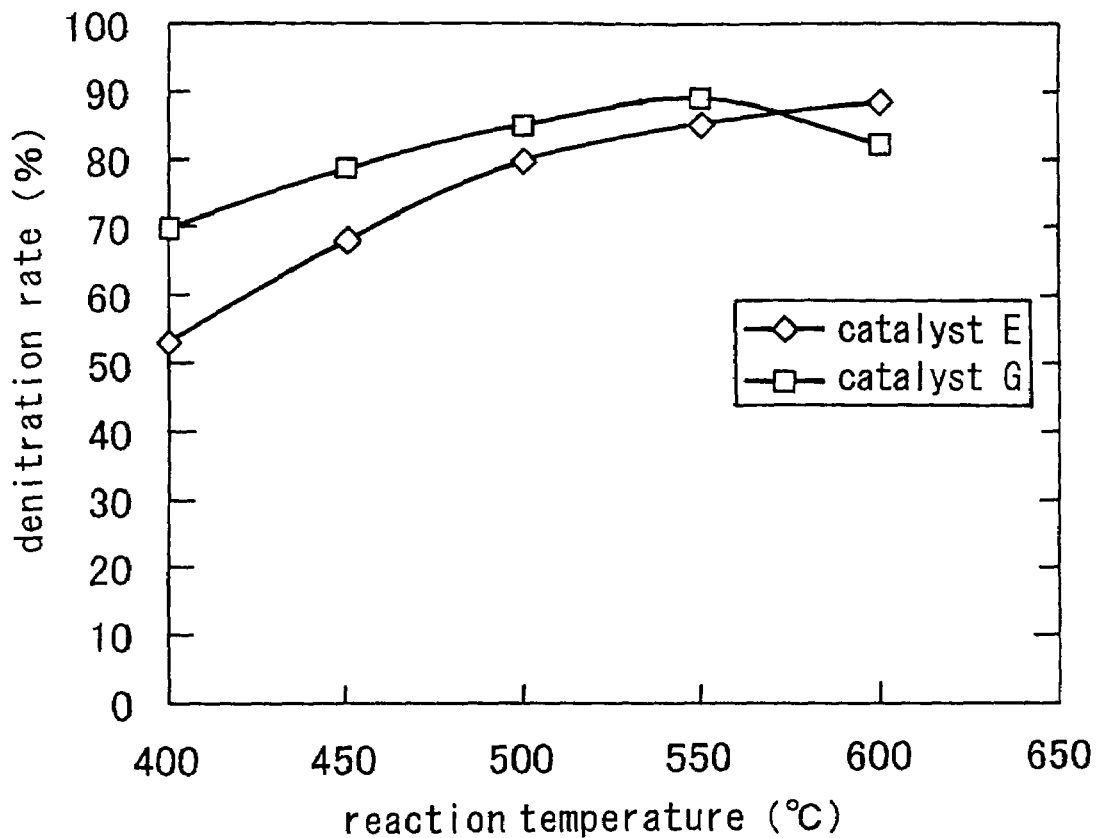
FIG. 7 is a graph showing relations between reaction temperatures and denitration rates.
Figure 9:
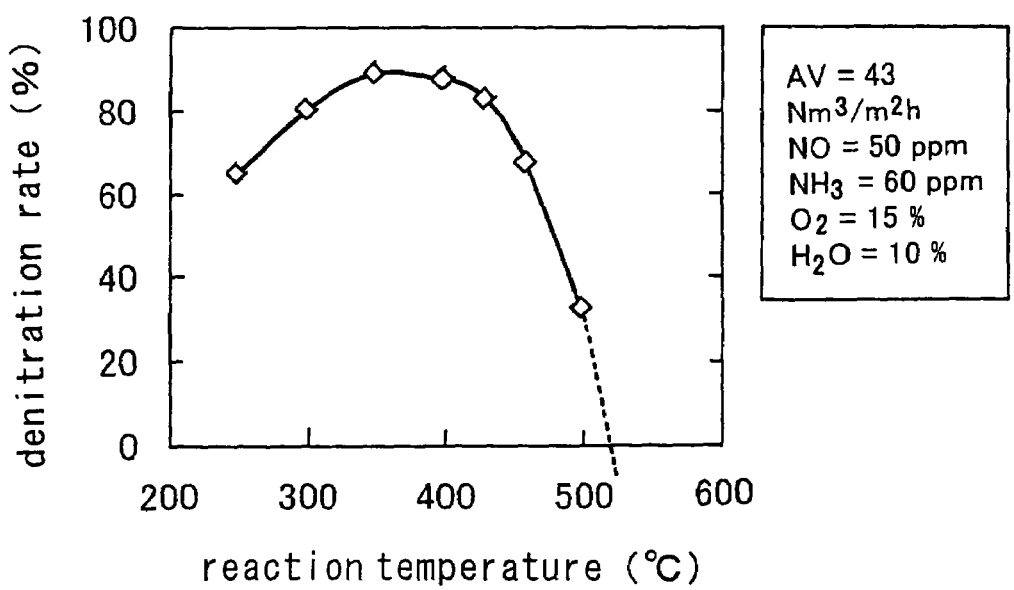
FIG. 9 is a graph of reaction temperatures and denitration rates showing denitration performance of a conventional catalyst.

A reaction tube made of quartz glass was filled with the particulate catalyst (E), and denitration performance was measured in an electric furnace at 450° to 600° C. under the following reaction conditions. Denitration performance was measured for the particulate catalyst (G) in the same manner, too. These results are shown in FIG. 7.

Reaction conditions SV: 90,000 1/h
(Raw gas flow rate/catalyst layer volume)
Inlet gas composition NO: 50 ppm
NH$_3$: 60 ppm
O$_2$: 10% by weight
H$_2$O: 10% by weight
CO$_2$: 9% by weight
N$_2$: balance (4) Performance of Plate Type Catalyst Pure water was added to the powder (100 mesh or less) of the superacid substance (E) to obtain slurry having a solid content of 20% by weight. Then concentrated sulfuric acid was added to the water in a ratio of 1/1,000 to 1/2,000 (volume ratio) in order to prevent the powder from aggregating.

Ceramic paper (SMS 05 manufactured by Nippon Inorganic Co., Ltd.) was immersed in the slurry, the slurry (solid+water) was retained among fibers of the paper, it was dried at 120° C. and calcined at 600° C. for three hours to obtain a plate type catalyst wherein 52 g/m$^2$ solid superacid powder (one side of the paper) was dispersed and retained. The catalyst was immersed in colloidal silica (Snowtex 0 manufactured by Nissan Chemical Co., Ltd.) having a solid content of 20% by weight, and the mixture was dried at 120° C. to obtain a strong plate type catalyst (H).

Further, the plate type catalyst (H) was immersed in a 1.0 mol/l aqueous ammonium metatungstate solution for 30 minutes, and the mixture was dried and calcined in air at 600° C. for three hours to obtain a plate type catalyst (J).

Figure 8:
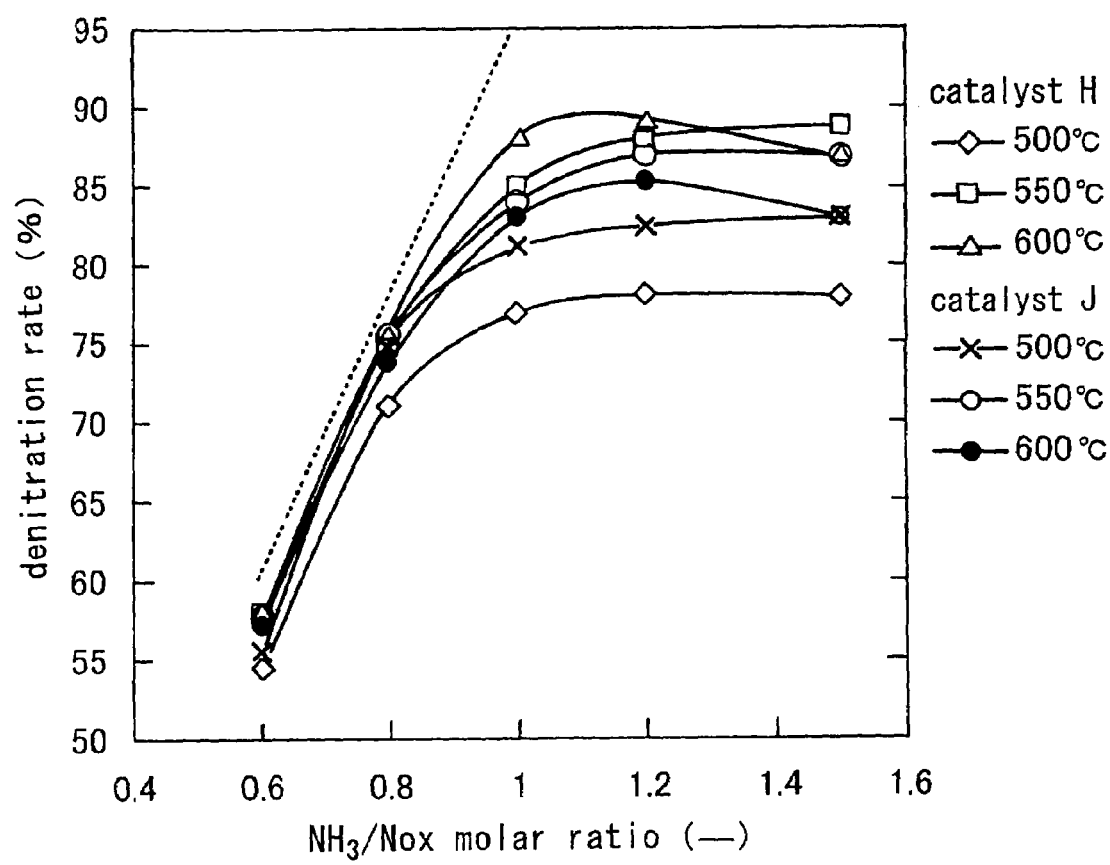
FIG. 8 is a graph showing relations between $NH_3/NOx$ molar ratios and denitration rates.

A denitration reaction apparatus was filled with the plate type catalyst (H), reaction temperatures were adjusted to 500° C., 550° C. and 600° C. in an electric furnace, denitration performance was measured under the following reaction conditions. Denitration performance was measured for the plate type catalyst (J) in the same manner, too. These results are shown in FIG. 8.

Reaction test conditions
Gas composition Inlet NO: 50 ppm
Inlet NH$_3$/NOx ratio: 0.6 to 1.5
O$_2$: 10% by weight
H$_2$O: 10% by weight
CO$_2$: 9% by weight
N$_2$: Rest
Catalyst amount AV: 20 Nm$^3$/h
(AV=Raw gas flow rate/catalyst geometrical surface area)

INDUSTRIAL APPLICABILITY

The first catalyst can denitrify an exhaust gas effectively at 450° to 600° C.

The second and third catalysts can denitrify an exhaust gas effectively in a high-temperature region at 450° to 800° C., preferably 500° to 800° C., more preferably 550° to 750° C.

The invention claimed is:

1. A method of high-temperature denitration characterized in that NOx in an exhaust gas is reduced at 450° to 800° C. using ammonia as a reducing agent in the presence of a catalyst which comprises zirconium oxide and SO$_3$ or SO$_4^{2-}$ and has solid acid strength (Ho) of −11.93 or lower.

2. A method of high-temperature denitration characterized in that NOx in an exhaust gas is reduced at 450° to 800° C. using ammonia as a reducing agent in the presence of a catalyst wherein at least one of tungsten oxide, molybdenum oxide and boron oxide is supported on a carrier comprising zirconium oxide and SO$_3$ or SO$_4^{2-}$ and having solid acid strength (Ho) of −11.93 or lower.

3. A method of high-temperature denitration characterized in that NOx in an exhaust gas is reduced at 450° to 800° C. using ammonia as a reducing agent in the presence of a catalyst obtained by a process wherein an aqueous solution of a nitrate or a chloride of zirconium is basified to form a zirconium hydroxide precipitate, then the precipitate is dried, followed by supporting a sulfuric radical on the precipitate, and the precipitate is calcined.

4. A high-temperature denitration catalyst which comprises zirconium oxide and SO$_3$ or SO$_4^{2-}$, has solid acid strength (Ho) of −11.93 or lower and is used in a high-temperature region at a reaction temperature of 450° to 800° C., or wherein at least one of tungsten oxide, molybdenum oxide and boron oxide is supported on a carrier comprising zirconium oxide and SO$_3$ or SO$_4^{2-}$ and having solid acid strength (Ho) of −11.93 or lower and which is used in a high-temperature region at a reaction temperature of 450° to 800° C., characterized in that the catalyst is dispersed and retained among fibers of ceramic paper.

5. A process for preparing the high-temperature denitration catalyst as claimed in claim 4, characterized in that the ceramic paper is impregnated with a dilute sulfuric acid slurry containing 10 to 35% by weight of the catalyst, optionally dried, and then calcined.

6. A high-temperature denitration catalyst which comprises zirconium oxide and SO$_3$ or SO$_4^{2-}$, has solid acid strength (Ho) of −11.93 or lower and is used in a high-temperature region at a reaction temperature of 450° to 800° C., or wherein at least one of tungsten oxide, molybdenum oxide and boron oxide is supported on a carrier comprising zirconium oxide and SO$_3$ or SO$_4^{2-}$ and having solid acid strength (Ho) of −11.93 or lower and which is used in a high-temperature region at a reaction temperature of 450° to 800° C., characterized in that the catalyst is dispersed and retained among fibers of a honeycomb structure obtained by superimposing flat ceramic paper and corrugated plate-like ceramic paper alternatively.

7. A process for preparing the high-temperature denitration catalyst as claimed in claim 6, characterized in that the honeycomb structure obtained by superimposing the flat ceramic paper and the corrugated plate-like ceramic paper alternatively is impregnated with a dilute sulfuric acid slurry containing 10 to 35% by weight of the catalyst, optionally dried, and then calcined.

8. A process for preparing the high-temperature denitration catalyst as claimed in claim 5 or 7, characterized in that a silica colloid solution having a solid concentration of 10 to 40% by weight is added to the slurry in a volume ratio of 0.05 to 1.0.

9. A high-temperature denitration catalyst for selective catalytic reduction of a nitrogen oxide in an exhaust gas comprising a composite oxide composed of titanium oxide and at least one of tungsten oxide, molybdenum oxide and boron oxide and having solid acid strength (Ho) of −11.93 or lower, characterized in that a binder is added to the catalyst and the obtained mixture is formed into a particle.

10. A high-temperature denitration catalyst as claimed in claim 9, characterized in that it is obtained by impregnating dry titanium oxide with a solution containing at least one of tungsten, molybdenum and boron, then drying the titanium oxide and calcinating it under an oxygen atmosphere at temperatures of 500° to 800° C.

11. A high-temperature denitration catalyst as claimed in claim 9 or 10, characterized in that the titanium oxide is amorphous titanium oxide.

12. A high-temperature denitration catalyst as claimed in claim 9 or 10, characterized in that it is dispersed and retained among fibers of a ceramic fiber preform.

13. A high-temperature denitration catalyst as claimed in claim 12, characterized in that the ceramic fiber preform is a honeycomb structure wherein a corrugated plate-like folded molded product and a flat molded product are superimposed alternately.

14. A method of denitration in a high-temperature region characterized in that a reducing agent is injected into an exhaust gas, and the exhaust gas is contacted with the catalyst as claimed in claim 9 at a reaction temperature of 400° to 700° C. to reduce and remove a nitrogen oxide in the exhaust gas.

15. A process for preparing a plate type high-temperature denitration catalyst characterized in that titanium oxide is dispersed and retained among fibers of a ceramic fiber preform, the titanium oxide is dried and impregnated with a solution containing at least one element of tungsten, molybdenum and boron, and then the preform is dried and calcined under an oxygen atmosphere at a temperature of 500° to 800° C. to obtain the plate type high-temperature denitration catalyst comprising a composite of the above-mentioned metals and having solid acid strength (Ho) of −11.93 or lower.

* * * * *